Oct. 18, 1960   JEAN-PIERRE DUBOIS   2,956,394
BEARING ELEMENT
Filed April 17, 1956
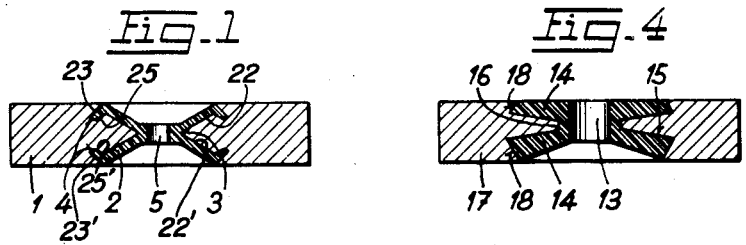
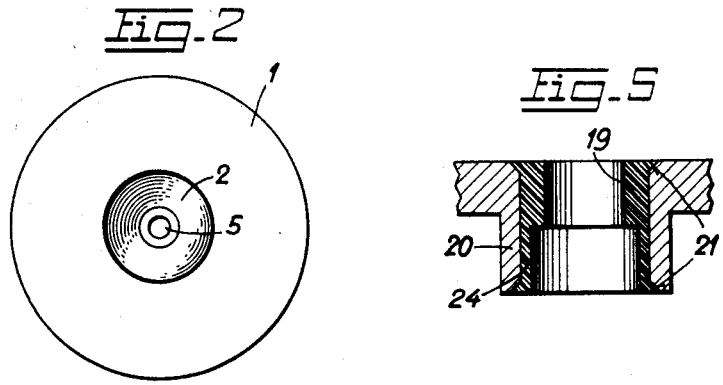
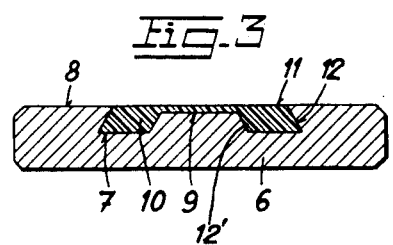
Inventor:
Jean-Pierre Dubois
By: Michael S. Striker
agt.

United States Patent Office 2,956,394
Patented Oct. 18, 1960

2,956,394

BEARING ELEMENT

Jean-Pierre Dubois, Le Locle, Switzerland, assignor to Fabrique d'horlogerie Chs. Tissot & Fils S.A., Le Locle, Switzerland, a Swiss company Filed Apr. 17, 1956, Ser. No. 578,785

Claims priority, application Switzerland Apr. 21, 1955

10 Claims. (Cl. 58—140)

This invention relates to bearing elements for the pivot of a movable part in a watch, a clock, a precision apparatus, a measuring instrument and the like.

It is an object of the invention to provide bearing elements which do not necessitate any lubricating.

It has been observed that a selflubricating material such as nylon gives interesting results. Even better results are obtained with "Ultramid A" sold by "Badische Anilin- & Soda-Fabrik" in Ludwigshafen (Germany), which is a lineary polymerized condensation product of a diacid and a diamine.

Those materials are, however, not suitable for making bearing elements which would have the form of usual watch jewels consisting of corundum. Although the said materials have hard surfaces in comparison with other plastics, blocks made out of such materials would not be rigid enough. In other words, a bushing made of nylon or of the said Ultramid A could not be pressed into a boring so as to remain in place, without deforming the said bushing substantially.

It is, however, also an object of the invention to use the selflubricating properties of the products mentioned above by providing only a thin coat of such material on a metallic support which gives that coat the necessary rigidity.

The materials mentioned do not adhere to any of the metals commonly considered for this purpose.

It is therefore still a further object of the invention to form the surface of contact between the metallic element and the said coat in such a manner that the said surface is provided with at least an annular groove for retaining the selflubricating coat in place on the metallic element.

Still further objects and advantages of the invention will be apparent in the course of the following description.

The drawings annexed to this specification represent, by way of example, one embodiment of the bearing element according to the invention for every type of bearings used in a watch.

In the drawings:

Fig. 1 is a sectional view of a radial bearing element for the balance-wheel;

Fig. 2 is a plan view of the bearing element shown in Fig. 1;

Fig. 3 is a sectional view of a bearing element which may be used as cap or end piece for the balance-wheel or another movable part of the watch;

Fig. 4 is a cross-section of a radial bearing element for a gear-wheel, and

Fig. 5 is a cross-section of a bearing element used for journalling the movable weight in a selfwinding watch.

The radial bearing element shown in Figs. 1 and 2 comprises a circular metallic element 1 partly covered by a coat 2 of self-lubricating material. This element 1 has a central aperture defined by a pair of oppositely directed frustoconical surfaces 22, 22' intersecting each other so as to form an annular edge face 3. Grooves 4 are also provided in element 1. Grooves 4 are in part defined by a pair of additional frustoconical surfaces 25, 25', respectively joined at their ends of smaller diameter to frustoconical surfaces 22, 22', respectively, and by a third pair of frustoconical surfaces 23, 23', spaced from and respectively facing the frustoconical surfaces 25, 25'. The edge face 3 constitutes a good support for the coat 2, which is cast in the element 1 as described hereinafter, since the coefficient of expansion of the plastics used is greater than that of the metal of element 1, so that the said coat shrinks on the element 1 and applies itself strongly on the faces of the edge 3 when cooling down. The grooves 4 constitute therefore a good grip for the coat 2 which forms, as a whole, an element which is distinct from element 1, but which cannot be removed therefrom. The coat 2 presses the surfaces of element 1 so strongly that the said coat will not even turn with respect to the element 1, for instance under the action of the pivot journalled in a bore 5 which is formed in the material of coat 2.

Since coat 2 has nowhere a thickness greater than 0.004 inch, it is rigid so that the walls of bore 5 offer a sufficient resistance to the balance-wheel pivot.

The outer surface of element 1 can obviously be given any desired form, so that said element may be used either as a movable element in a shock-absorbing bearing, or as a removable element in a fixed bearing.

The cap piece represented in Fig. 3 comprises a flat circular metallic element 6 having on one side a circular flat surface 9 which stands somewhat back from face 8 of the element 1 and an annular groove 7 surrounding the flat circular surface 9 and being defined by a pair of spaced frustoconical surfaces 12, 12' of substantially the same inclination and facing each other.

This groove 7 serves as lodging for a coat of a self-lubricating material 10 which fills the groove 7 and covers the surface 9. The outer face 11 of coat 10, with which the extremity of the pivot comes in contact, is situated on a level with the face 8 of the metallic element 1. The truncated-conical surface 12 forms an engaging and retaining surface for the coat 10.

The cap element described may be used instead of a cap jewel. In the watch in particular, it may serve for the balance-wheel or for any other movable part. It may be mounted like a usual jewel, i.e. it may be either pressed in a setting or directly in a boring of a bridge or the base-plate of the watch, or mounted or set in an independent plaquette screwed in a lodging of a frame part, or eventually mounted, in a shock-absorbing bearing, so that it can move against the action of a return-spring as a result of an impact. In order to prevent, in particular in the latter case, the pivot from penetrating the coat of selflubricating material, which is obviously softer than the material of the pivot, this coat is made very thin on surface 9 so that the latter constitutes a good support for the said coat while hardening it. The coat of plastics thus replaces the oil drop set on the usual cap pieces.

The bearing element represented in Fig. 4 is analogous to that of the balance-wheel pivot described above with reference to Figs. 1 and 2. The bearing of Fig. 4 is, however, provided with a larger central bore 13. Moreover, the coats 14, which cover the frustoconical surfaces 15 of the metallic element 17, have such a thickness that the grooves 18, provided in element 17 around the surfaces 15, retain the coat 14 in place satisfactorily. The surfaces 15 form an edge face 16 which defines the central aperture of element 17.

Since the pressure exerted by a wheel pivot is substantially stronger than that of the balance-wheel pivot, the edge face 16 is not sharp like in Fig. 1 but it has preferably the form of a cylinder. If the coats 14 appear very thick in comparison with the first embodiment, it will be observed that the plastics part which covers the cylindrical wall of edge face 16 has about the same thickness as the coat of Figs. 1 and 2. The walls of bore 13 offer therefore also a satisfactory rigidity for the pivot journalled in this element.

The bearing element represented in Fig. 5 is intended for journalling the pivot of a rockable weight in a self-winding watch and it is substantially higher than the bearing elements described above. The selflubricating coat 19 which covers the cylindrical surface 24 of the metallic element 20 has substantially the form of a sleeve. In order to secure this sleeve to element 20, a frustoconical surface 21 is provided at each end of cylindrical surface 24. The frustoconical surfaces 21 are directed in opposite direction and have each a smaller end located directly next to the cylindrical surface 24.

It will be observed in the described embodiments, that the selflubricating coat cannot be mounted in the metallic element when it is rigid. It must therefore be cast in place when it is still liquid.

If Ultramid A is used, it is heated at about 527° F. and cast in a mould comprising, besides the metallic element itself, two parts adapted for encompassing this metallic element thus giving said coat its eventual form. This mould is arranged so that its two said parts may be thrust against one another by screw means so as to encompass the plastics and to compress it very strongly, while it is still liquid. Experiments have shown that good results are obtained in the conditions described with a pressure of about 130,000 lb./sq.-inch.

The casting device and the moulds must be airtight, since liquid Ultramid A alters itself if it is exposed to the atmosphere.

The invention can obviously be applied to every bearing member analogous to those used in watches. It may also be applied with other selflubricating materials the properties of which are similar to those of Ultramid A or nylon.

Watches provided with bearing elements as described above run satisfactorily without any drop of oil and no unusual wear can be observed even after a running period which corresponds to one year of normal use.

While several embodiments of the invention have been shown and described in detail, it should obviously be understood that various changes in the shape, sizes and arrangement of parts could be resorted to without departing from the scope of the subjoined claims or sacrificing the advantages thereof.

I claim:

1. A bearing for a watch comprising, in combination, a metallic supporting element small enough to form a part of a bearing of a watch and having a circular surface directed toward a free space which is adapted to receive the part which is to be rotatably supported by the bearing, said metallic element having at least one frustoconical surface which has one end of a smaller diameter than its opposite end, said opposite end of said frustoconical surface being located distant from said circular surface and said one end of said frustoconical surface being located directly next to said circular surface; and a thin coating of a self-lubricating plastic material covering and engaging said circular and frustoconical surfaces and having a free surface directed away from said circular surface and adapted to directly engage the part which is to be rotatably supported by the bearing, said metallic element having at least one additional frustoconical surface facing in a direction different from the first-mentioned frustoconical surface and also covered and engaged by said coating of plastic material, said frustoconical surfaces cooperating with said coating to retain the latter on said metallic element.

2. A bearing as recited in claim 1 and wherein said circular surface is in the form of an edge face defining an opening of said metallic element and wherein said additional frustoconical surface has a pair of opposite ends one of which is larger than the other, said smaller end of said additional frustoconical surface being located directly next to the larger end of said first-mentioned frustoconical surface, and all of said surfaces being coaxially arranged with respect to the axis of said opening.

3. A bearing as recited in claim 1 and wherein said circular surface is flat and said one and said additional frustoconical surfaces are of substantially the same inclination and facing each other to define between themselves a groove of said metallic element which surrounds said circular surface with said frustoconical surfaces defining the side surfaces of said groove, and said additional frustoconical surface forming an undercut portion of said metallic element which receives an outer peripheral portion of said coating, said coating having its free outer surface flush with an outer side surface of said metallic element.

4. A bearing as recited in claim 1 and wherein said circular surface is in the form of an edge face defining an opening of said metallic element and wherein said additional frustoconical surface has a pair of opposite ends one of which is smaller than the other, said smaller end of said additional frustoconical surface being located directly next to the larger end of said first-mentioned frustoconical surface, and all of said surfaces being coaxially arranged with respect to the axis of said opening, said frustoconical surfaces being directed away from each other and defining an outer surface of an annular projection of substantially V-shaped cross-section which coaxially surrounds said circular surface.

5. A bearing as recited in claim 1 and wherein said circular surface is in the form of an edge face defining an opening of said metallic element and wherein said additional frustoconical surface has a pair of opposite ends one of which is larger than the other, said larger end of said additional frustoconical surface being located directly next to the larger end of said first-mentioned frustoconical surface, and all of said surfaces being coaxially arranged with respect to the axis of said opening, said frustoconical surfaces facing each other and defining between themselves an annular undercut groove of said metallic element which receives a portion of said coating.

6. A bearing as recited in claim 1 and wherein said circular surface forms a cylinder and wherein said frustoconical surfaces are respectively located at the ends of said cylinder and are directed in opposite directions with the smaller end of said additional frustoconical surface located directly next to said circular cylindrical surface.

7. A bearing as recited in claim 1 and wherein said circular surface is in the form of an edge face defining an opening of said metallic element and wherein said additional frustoconical surface has a pair of opposite ends one of which is smaller than the other, said smaller end of said additional frustoconical surface being located directly next to the larger end of said first-mentioned frustoconical surface, and all of said surfaces being coaxially arranged with respect to the axis of said opening, said frustoconical surfaces being directed away from each other and defining an outer surface of an annular projection of substantially V-shaped cross-section which coaxially surrounds said circular surface, said metallic element being formed with an annular undercut groove defined in part by said additional frustoconical surface and in part by a further frustoconical surface spaced from and facing said additional frustoconical surface, said coating having a peripheral portion extending into said groove.

8. A bearing for a watch, comprising, in combination, a metallic element small enough to form part of a bearing of a watch, said metallic element having a pair of end faces, an outer periphery extending between said end faces and an inner annular circular surface defining an opening of said metallic element and surrounded by said outer periphery thereof, said metallic element having between said inner circular surface and said outer periphery thereof a pair of frustoconical surfaces coaxial with said circular surface and directed in substantially opposite directions, respectively, said frustoconical surfaces being spaced from each other and extended inwardly from said end faces, respectively, the apex of each said frustoconical surfaces being located outwardly of the respective end face; and a thin coating of self-lubricating plastic material covering said circular surface and said frustoconical surfaces and engaging said metallic element at said circular and frustoconical surfaces thereof.

9. A bearing for a watch, comprising, in combination, a metallic element small enough to form part of a bearing of a watch, said metallic element having an outer periphery and having an inner periphery in the form of a circular surface which defines an opening of said metallic element, said circular surface being substantially in the form of an edge face formed at the intersection of a pair of oppositely directed frustoconical surfaces of said metallic element and said metallic element having an additional pair of frustoconical surfaces respectively extending from the ends of the first-mentioned pair of frustoconical surfaces distant from said circular surface, said additional pair of frustoconical suraces being respectively joined at their ends of smaller diameter to said first-mentioned pair of frusto-conical surfaces and said pairs of frustoconical surfaces cooperating together to define a pair of projections of substantially V-shaped cross-section directed away from each other, coaxial with said circular surface and located between said circular surface and said outer periphery, and said metallic element being formed with a pair of annular undercut grooves coaxial with said opening and defined in part by said pair of additional frustoconical surfaces and in part by a third pair of frustoconical surfaces spaced from and respectively facing said additional pair of frustoconical surfaces; and a thin coating of self-lubricating plastic material covering and engaging said circular surface and all of said frustoconical surfaces, said coating respectively having a pair of peripheral portions extending into said pair of undercut grooves.

10. A bearing for a watch, comprising, in combination, a metallic supporting element small enough to form a part of a bearing of a watch and having a circular pivot-supporting portion directed toward a free space which is adapted to receive a pivot which is to be rotatably supported by the bearing, said metallic element having at least one frusto-conical surface which has one end of a smaller diameter than its opposite end, said opposite end of said frustoconical surface being located distant from said circular pivot-supporting portion and said one end of said frustoconical surface being located directly next to said circular pivot-supporting portion; and a thin coating of a self-lubricating plastic material covering and engaging said pivot-supporting portion and said frustoconical surface and having a free surface directed away from said circular pivot-supporting portion and adapted to directly engage the part which is to be rotatably supported by the bearing, said metallic element having at least one additional frustoconical surface facing in a direction different from the first mentioned frustoconical surface and also covered and engaged by said coating of plastic material, said frustoconical surfaces cooperating with said coating to retain the latter on said metallic element.

References Cited in the file of this patent

UNITED STATES PATENTS

| 2,246,086 | Austin | June 17, 1941 |
| 2,276,143 | Bell | Mar. 10, 1942 |
| 2,459,598 | Stott | Jan. 18, 1949 |
| 2,702,730 | Ivanoff | Feb. 22, 1955 |
| 2,720,119 | Sherman | Oct. 11, 1955 |